(12) United States Patent
Shieh

(10) Patent No.: US 7,263,776 B1
(45) Date of Patent: Sep. 4, 2007

(54) FRUIT AND VEGETABLE SEED REMOVING DEVICE

(75) Inventor: Jaw-Chyi Shieh, Taipei (TW)

(73) Assignee: Hausco Enterprises Co., Ltd., Kowloon Bay (HK)

( * ) Notice: Subject to any disclaimer, the term of this patent is extended or adjusted under 35 U.S.C. 154(b) by 0 days.

(21) Appl. No.: 11/414,241

(22) Filed: May 1, 2006

(51) Int. Cl.
*B26B 29/00* (2006.01)

(52) U.S. Cl. .................. 30/314; 30/279.6; 30/280; 30/304; 83/13; 99/545; 99/542; 99/584; 99/588

(58) Field of Classification Search .............. 30/314, 30/279.6, 280, 304, 355, 388, 294, 299, 316, 30/303; 83/13; 99/542, 545, 584, 588
See application file for complete search history.

(56) References Cited

U.S. PATENT DOCUMENTS 5,279,035 A * 1/1994 Cohen et al. ............... 30/294
5,452,514 A * 9/1995 Enfaradi ..................... 30/272.1
5,865,110 A * 2/1999 Yonezawa ................... 95/588

* cited by examiner

*Primary Examiner*—Joseph J. Hail, III
*Assistant Examiner*—Anthony Ojini

(57) ABSTRACT

A fruit seed removing device includes a body, a sleeve, a button, a positioning block, a toggle, a pull rod, a connecting block and a knife. By pulling a hand of a pull rod, the pull rod will drive the knife to move inwards or expand outwards. Then the button is rotate through an angle to drive the positioning block to rotate. Then the pull rod is tightened and positioned. Therefore, the size of a ring for removing seeds is set. The adjustment of the size of the ring can be performed quickly and easily according to the range of the seeds in a fruit. Thereby no pulp will adhere to the user's hand. The operation is retained in clean state and can be performed easily and conveniently.

6 Claims, 6 Drawing Sheets

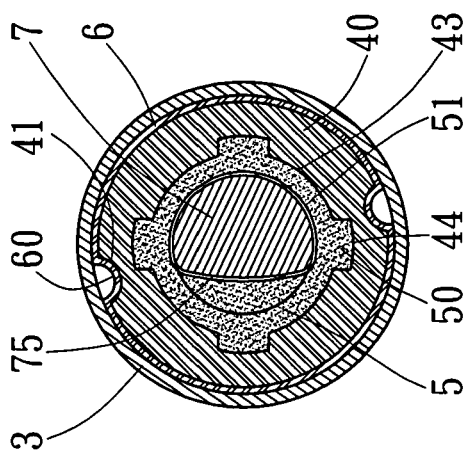
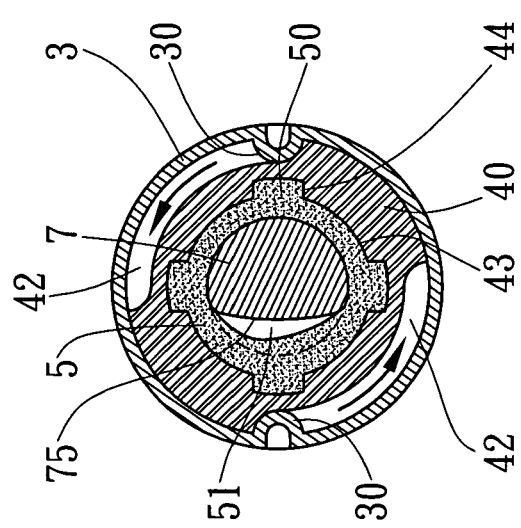
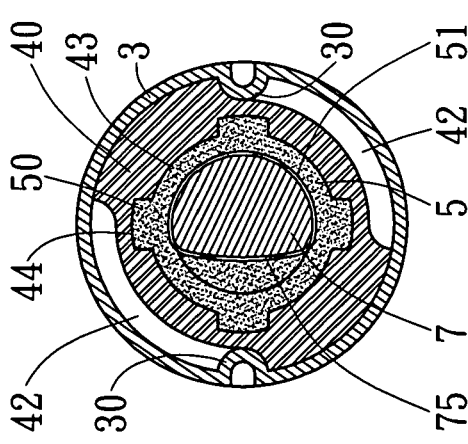

FRUIT AND VEGETABLE SEED REMOVING DEVICE

FIELD OF THE INVENTION

The present invention relates to fruit and vegetable seed removing device, and in particular to a fruit and vegetable seed removing device, wherein the adjustment of the size of a ring for cutting the seeds can be performed quickly and easily according to the range of the seeds in a fruit. Thereby no pulp will adhere to the user's hand. The operation is retained in clean state and can be performed easily and conveniently.

BACKGROUND OF THE INVENTION

Most of fruits and some vegetables have seeds, such as balsam pear seeds, Hami melon seeds, watermelon seeds, apple seeds, etc. In most cases, the seeds are not eaten. Generally, the fruit or vegetable is cut into two halves for removing seeds by a hand or a spoon. The size of the spoon is selectable according to the ranges of the seeds. The operation is inconvenient. Thereby the pulp will be dirt and the hand will adhere with pulp. It is inconvenient to clean the hand or spoon. Thereby not all the seeds can be removed effectively.

SUMMARY OF THE INVENTION

Accordingly, the primary object of the present invention is to provide a fruit and vegetable seed removing device, wherein the adjustment of the size of the ring can be performed quickly and easily according to the range of the seeds in a fruit. Thereby no pulp will adhere to the user's hand. The operation is clean.

To achieve above objects, the present invention provides A fruit and vegetable seed removing device which comprises: a body having a receiving chamber; a wall of the receiving chamber having a plurality of slots; one side of an opening of the body having two recesses; a sleeve having at least one projection protruded from an inner wall of the sleeve and near an opening of the sleeve; a button installed at one end of the sleeve; one end of the button being installed with a protrusion; a transversal recess vertical to the trenches is formed on the outer wall of the protrusion; a receiving room being installed in the button; an inner wall of the receiving room being formed with four buckling grooves; another end of the button having a through hole which communicated the receiving room to an outer side; a position block installed in the receiving chamber of the button; an outer wall of the positioning block being formed with four strips which are spaced with equal distance; a pull rod passing through the button; the positioning block, the sleeve and the body; a pull handle being assembled to the end of the pull rod; another end of the pull rod being formed with a through hole for receiving a connecting element; and a knife passing through the recesses of the body; two ends of the knife being formed with respective through holes; the knife being bent to be as a ring.

The various objects and advantages of the present invention will be more readily understood from the following detailed description when read in conjunction with the appended drawing.

BRIEF DESCRIPTION OF THE DRAWINGS

FIG. 4 is an enlarged cross sectional view along line 1-1 of FIG. 3.

FIG. 5 is an enlarged cross sectional view showing the rotation of the button in FIG. 4.

FIG. 6 is an enlarged cross sectional view along line 2-2 of FIG. 3.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
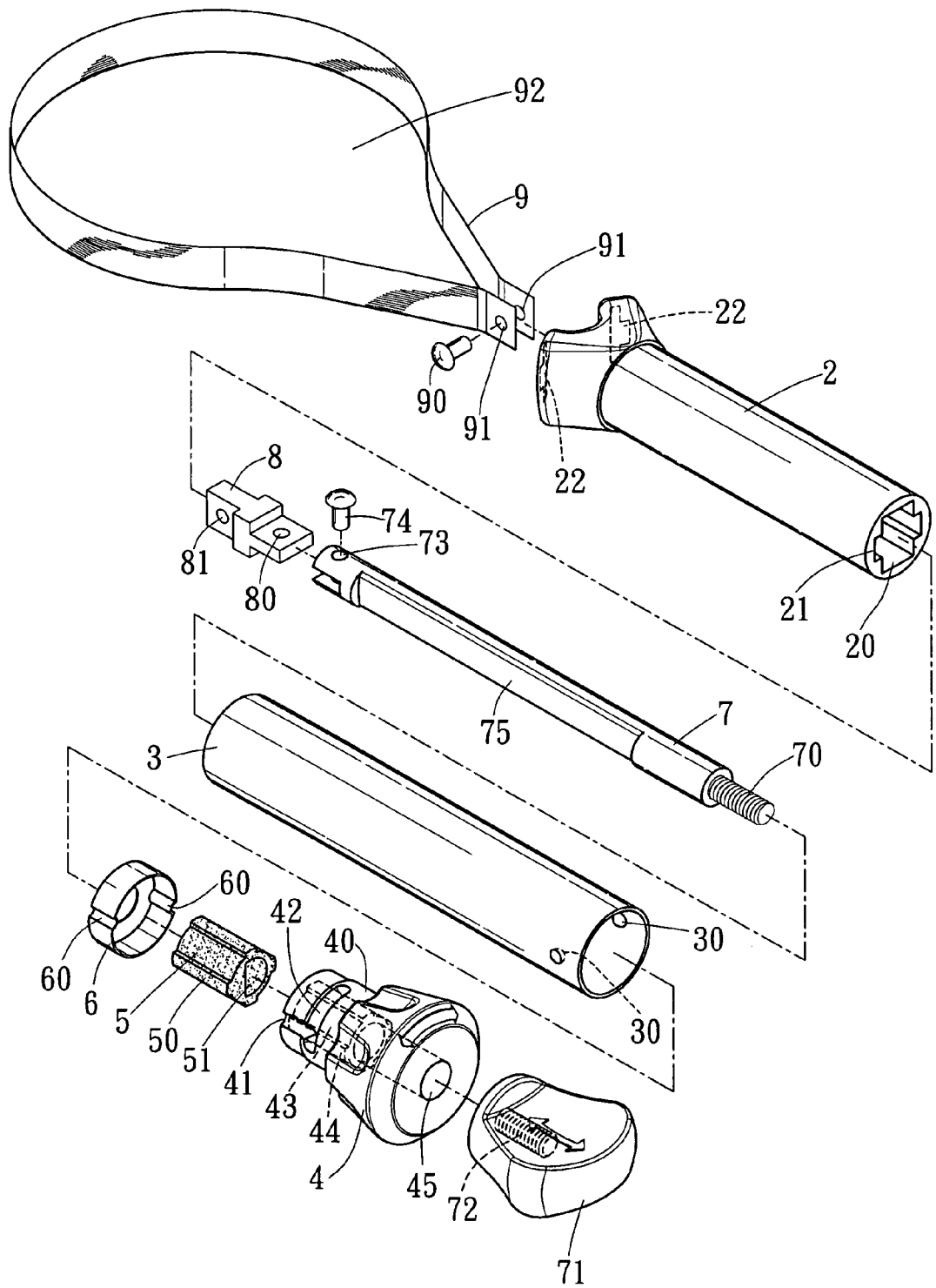
FIG. 1 is an exploded perspective view of the present invention.
Figure 2:
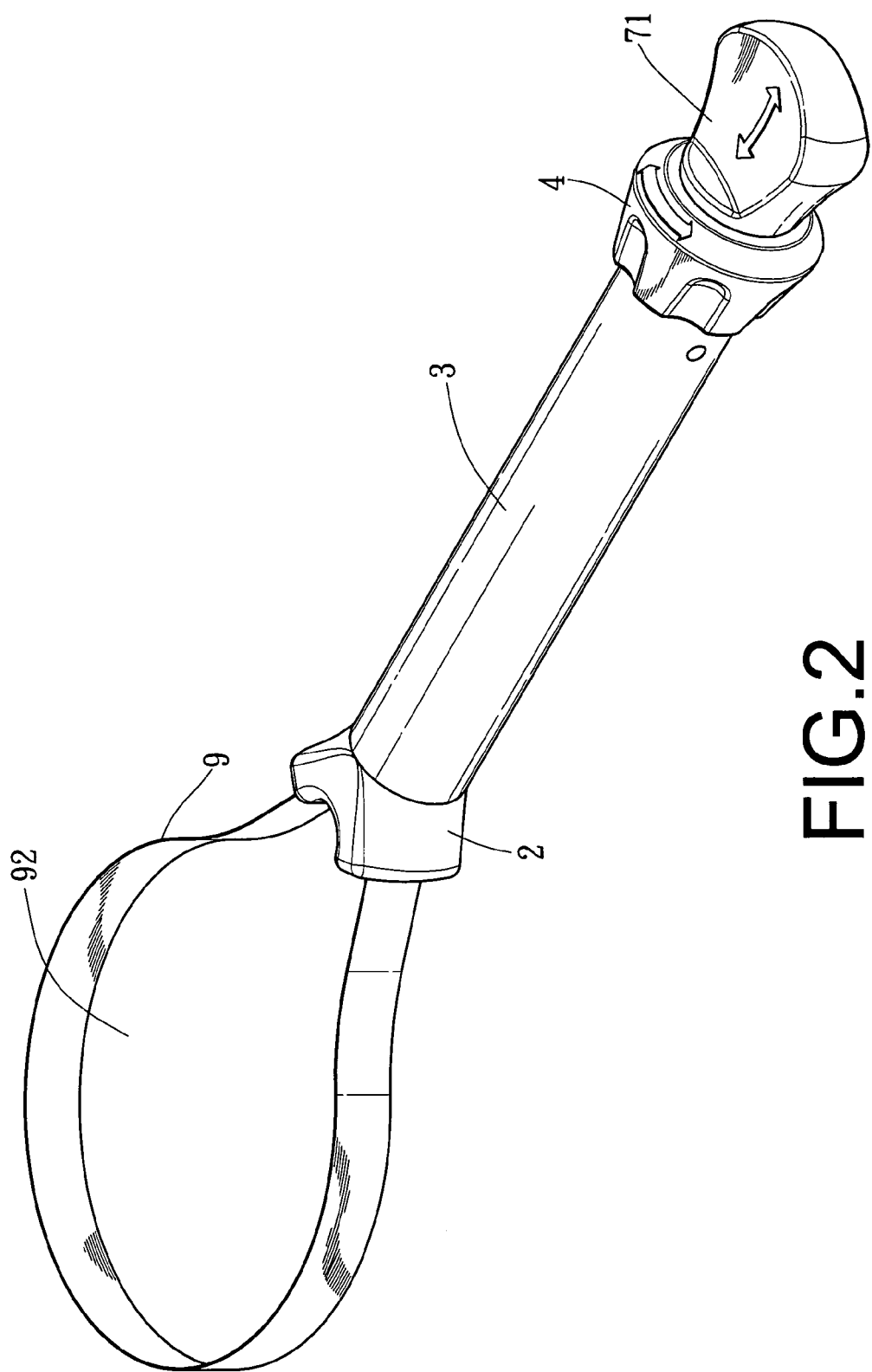
FIG. 2 is an assembled perspective view of the present invention.
Figure 3:
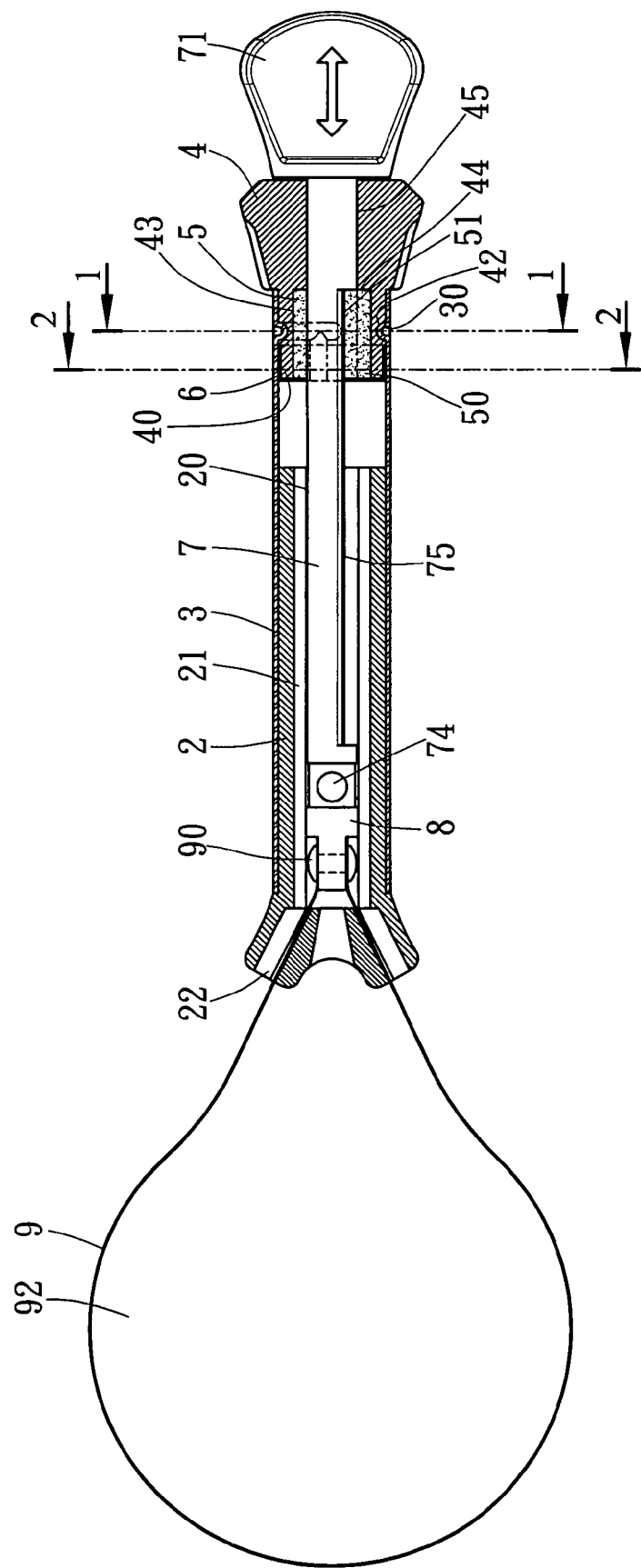
FIG. 3 is an assembled cross sectional view of the present invention.

Referring to FIGS. 1 to 3, the element of the present invention is illustrated in the following.

A body 2 has a receiving chamber 20. A wall of the receiving chamber 20 has a plurality of slots 21. One side of an opening of the body 2 has two recesses 22.

A sleeve 3 has at least one projection 30 protruded from an inner wall of the sleeve and near an opening of the sleeve 3. In this embodiment, two projections 30 are illustrated.

A button 4 is installed at one end of the sleeve 3. One end of the button 4 is installed with a protrusion 40. An outer wall of the protrusion 40 is formed with two trenches 41. A transversal recess 42 vertical to the trenches 41 is formed on the outer wall of the protrusion 40. A receiving room 43 is installed in the button 4. An inner wall of the receiving room 43 is formed with four buckling grooves 44. Another end of the button 4 has a through hole 45 which is communicated the receiving room 43 to an outer side.

A position block 5 is installed in the receiving chamber 43 of the button 4. The positioning block 4 is made of silica gel material. An outer wall of the positioning block 5 is formed with four strips 50 which are spaced with equal distance. An interior of the positioning block 5 is formed with an approximate semi-round positioning hole 51.

A toggle 6 is installed to the protrusion 40 of the button 4. The toggle 6 has an inner concaved surface 60.

A pull rod 7 passes through the button 4, the positioning block 5, the toggle 6, the sleeve 3 and the body 2. One end of the pull rod 7 is formed with outer threads 70. A pull handle 71 is assembled to the end of the pull rod 7. The pull handle 71 has a hollow inner space with inner threads 72. Another end of the pull rod 7 is formed with a through hole 73 for receiving a connecting element 74. A middle section of the pull rod 7 is formed with a sliding groove 75 so that the cross section of the pull rod 7 in that portion is formed as a semi-round shape for coupling a positioning hole of the positioning block 5. A connecting block 8 is installed at another end of the pull rod 7. The connecting block 8 has two through holes 80, 81 which are vertically arranged. A knife 9 passes through the recesses 22 of the body 2 and is connected to the connecting block 8 through a connecting element 90. Two ends of the knife 9 are formed with respective through holes 91. The knife 9 is bent as a ring 92.

In assembly, referring to FIGS. 1 and 2, firstly, two ends of the knife 9 are received into the receiving chamber 20 of the body 2 from the recesses 22 of the body 2. The connecting element 90 passes through the through holes 91 of the knife 9 and the through holes 81 of the connecting block 8. Two ends of the knife 9 are fixed to the connecting block 8. Another connecting element 74 passes through the through holes 73, 80 of the pull rod 7 and the connecting block 8 so as to combine the pull rod 7 to the connecting block 8. Then the sleeve 3 sleeves the body 2. The positioning block 5 is assembled to the receiving room 43 of the button 4 so that the strips 50 of the positioning block 5 are embedded into the buckling grooves 44 of the button 4 (referring to FIG. 4). Then the toggle 6 encloses the protrusion 40 of the button 4 so that the inner concave surface 60 of the toggle is embedded into the trenches 41 of the protrusion 40 (referring to FIG. 6). Then the button 4 is assembled to one end of the sleeve 3 so that the projection 30 of the sleeve 3 is embedded into the transversal recess 42 of the button 4 (referring to FIG. 4) and the pull rod 7 passes through the positioning hole 51 of the positioning block 5 and the through hole 45 of the button 4. Since the positioning block 5 is made of elastic silica gel. Thus, the positioning hole 51 will expand due to the elasticity of the rod body of the pull rod 7. When the portion of the pull rod 7 having the sliding groove 75 is positioned in the positioning hole 51, the positioning hole 51 will return elastically to match the wall of the sliding groove 75 so that the positioning block 5 slides in the sliding groove 75. The outer thread 70 of the pull rod 7 protrudes out of the button 4. Then the handle 71 is screwed to the outer thread 70 of the pull rod 7. Therefore, the assembly of the present invention is complete (referring to FIGS. 2 and 3).

Figure 7:
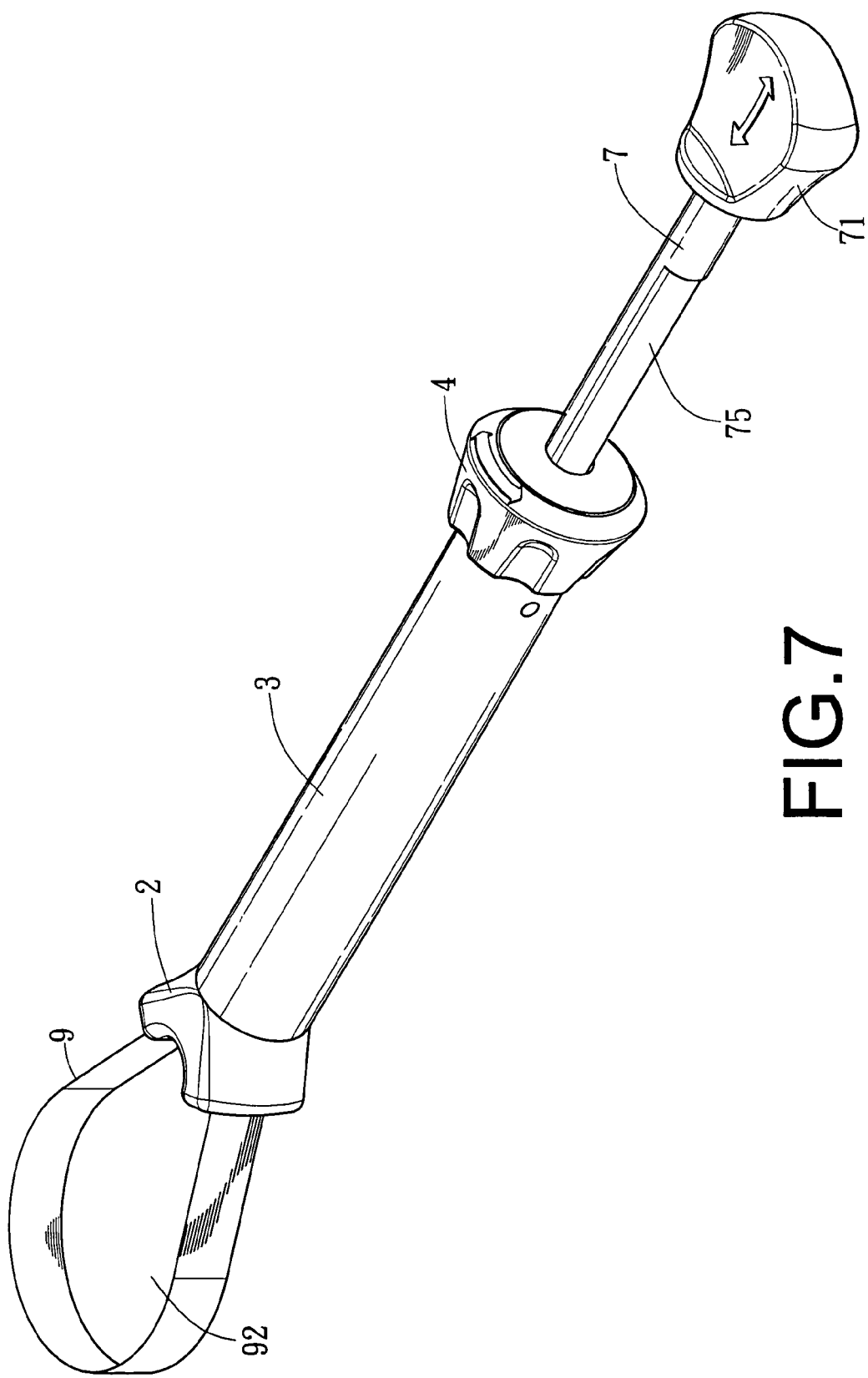
FIG. 7 is a schematic view showing the pulling operation of the pull rod according to the present invention.
Figure 8:
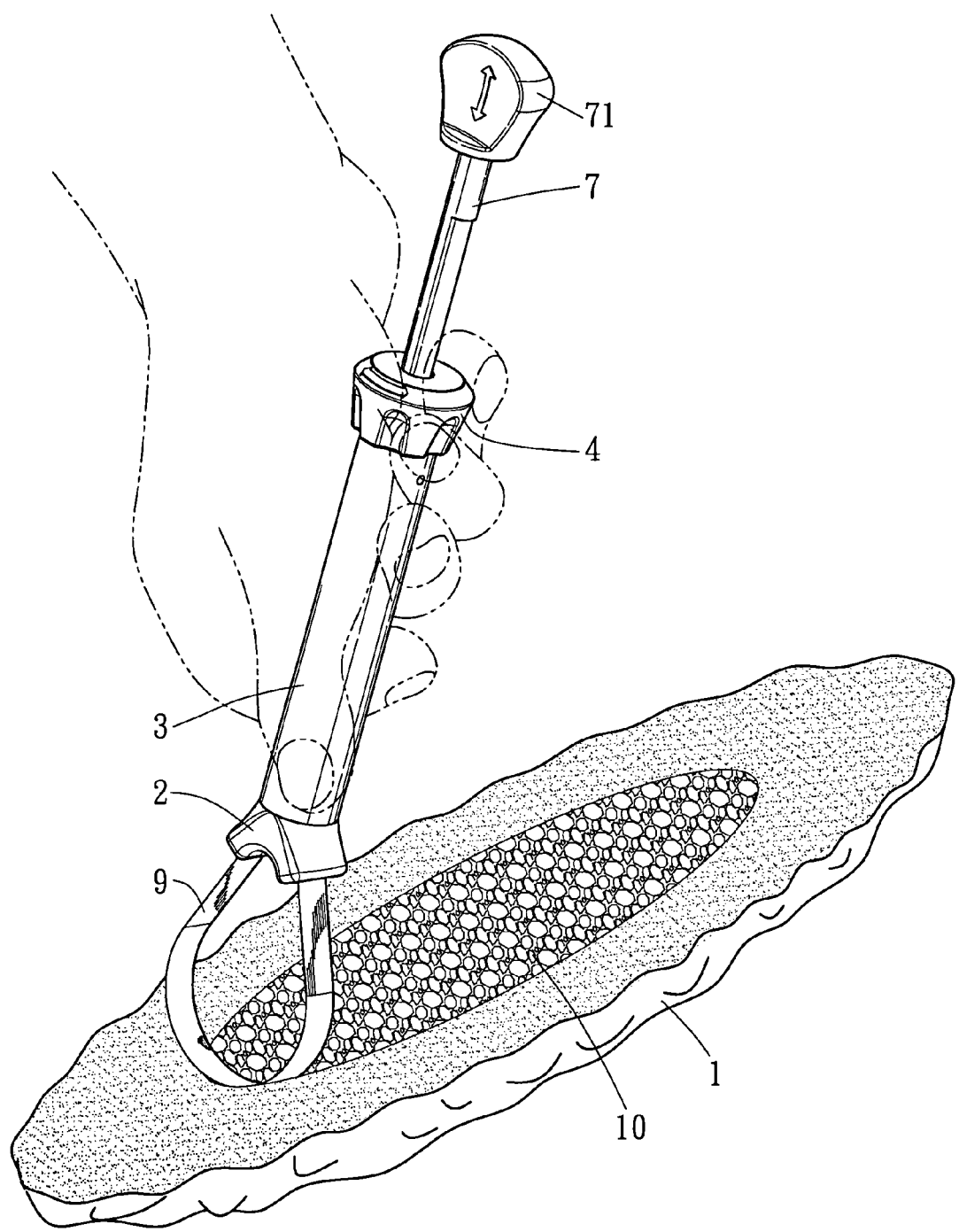
FIG. 8 is a schematic view showing the operation of taking seeds from a fruit according to the present invention.

In use, referring to FIGS. 2 to 5, the size of the ring 92 of the knife 9 is adjusted according to the range of the seeds of the fruit to be taken out. Firstly, the handle 71 is pulled out. The pull rod 7 is driven to move outwards. The pull rod 7 will pull the two ends of the connecting block 8 and the knife 9 to move in the receiving chamber 20. Then the size of the ring 92 of the knife 9 is reduced by the recesses 22 (referring to FIG. 7). When it is adjusted to a desired size, the button 4 is rotated through an angle. The projection 30 of the sleeve 3 is positioned at the transversal recess 42 of the protrusion 40 of the button 4. The button 4 will drive the positioning block 5 in the receiving room 43 to rotate together. After the positioning block 5 made of silica gel material rotates, the small diameter portion of the positioning hole 51 will rotate therewith to buckle to a large diameter portion of the pull rod 7 (referring to FIGS. 4 and 5). Thus the positioning block 5 will tightly position the pull rod 7 motionless. Therefore, the size of the ring 92 of the knife 9 is fixed. The knife 92 resists against the seeds 10 of the fruit 1 to take the seeds out. Thus the seeds 10 can be removed easily (referring to FIG. 8). When it is desired to adjust the size of the ring 92 of the knife 9, it is only necessary to rotate the button 4 reversely so that the button 4 drive the positioning block 5 not to tightly resist against the rod wall. Thus the pull rod 7 is movable in the positioning hole 51. Therefore, the size of the ring 92 is adjustable. The use is very convenient.

From above description, it is known that the present invention has the following advantages. The adjustment of the size of the ring can be performed quickly and easily. No pulp will adhere to the user's hand. The operation is clean and convenient.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A fruit and vegetable seed removing device comprising:
a body having a receiving chamber; a wall of the receiving chamber having a plurality of slots; one side of an opening of the body having two recesses;
a sleeve having at least one projection protruded from an inner wall of the sleeve and near an opening of the sleeve;
a button installed at one end of the sleeve; one end of the button being installed with a protrusion; a transversal recess vertical to the trenches is formed on the outer wall of the protrusion; a receiving room being installed in the button; an inner wall of the receiving room being formed with four buckling grooves; another end of the button having a through hole which communicated the receiving room to an outer side;
a position block installed in the receiving chamber of the button; an outer wall of the positioning block being formed with four strips which are spaced with an equal distance;
a pull rod passing through the button; the positioning block, the sleeve and the body; a pull handle being assembled to the end of the pull rod; another end of the pull rod being formed with a through hole for receiving a connecting element; and
a knife passing through the recesses of the body; two ends of the knife being formed with respective through holes; the knife being bent to be as a ring.

2. The fruit and vegetable seed removing device as claimed in claim 1, wherein an outer wall of the protrusion is formed with two trenches; a toggle is installed to the protrusion of the button and the toggle has an inner concaved surface.

3. The fruit and vegetable seed removing device as claimed in claim 1, wherein the positioning block is made of silica gel material.

4. The fruit and vegetable seed removing device as claimed in claim 1, wherein an interior of the positioning block is formed with an approximate semi-round positioning hole; a middle section of the pull rod is formed with a sliding groove so that the cross section of the pull rod in that portion is formed as a semi-round shape for coupling the positioning hole of the positioning block.

5. The fruit and vegetable seed removing device as claimed in claim 1, wherein the pull handle has a hollow inner space with inner threads; another end of the pull rod is formed with a through hole for receiving a connecting element.

6. The fruit and vegetable seed removing device as claimed in claim 1, wherein a connecting block is installed at another end of the pull rod; the connecting block has two through holes which are vertically arranged; and the knife passes through the recesses of the body and is connected to the connecting block through a connecting element.

* * * * *